(12) United States Patent
Olen

(10) Patent No.: US 9,163,933 B1
(45) Date of Patent: Oct. 20, 2015

(54) WEARABLE HEAD TRACKING SYSTEM

(71) Applicant: Vadim Olen, Cedar Rapids, IA (US)

(72) Inventor: Vadim Olen, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 29 days.

(21) Appl. No.: 14/228,456

(22) Filed: Mar. 28, 2014

(51) Int. Cl.
*G01J 5/02* (2006.01)
*G01B 11/14* (2006.01)
*A63F 13/00* (2014.01)

(52) U.S. Cl.
CPC .............. *G01B 11/14* (2013.01); *A63F 13/00* (2013.01)

(58) Field of Classification Search
CPC ........ G01C 21/20; G01C 22/00; G01B 7/003; G01B 11/002; G01B 11/14
USPC ........................................... 250/349
See application file for complete search history.

(56) References Cited

U.S. PATENT DOCUMENTS

| | | | |
|---|---|---|---|
| 5,854,843 A * | 12/1998 | Jacknin et al. | 381/309 |
| 6,181,371 B1 * | 1/2001 | Maguire, Jr. | 348/121 |
| 8,554,509 B2 * | 10/2013 | Crisco et al. | 702/141 |
| 2004/0149036 A1 * | 8/2004 | Foxlin et al. | 73/511 |
| 2005/0041100 A1 * | 2/2005 | Maguire | 348/121 |
| 2011/0106339 A1 * | 5/2011 | Phillips et al. | 701/2 |
| 2014/0168261 A1 * | 6/2014 | Margolis et al. | 345/633 |
| 2014/0287806 A1 * | 9/2014 | Balachandreswaran | 463/7 |

* cited by examiner

*Primary Examiner* — David J Makiya
*Assistant Examiner* — Taeho Jo
(74) *Attorney, Agent, or Firm* — Angel N. Gerdzhikov; Donna P. Suchy; Daniel M. Barbieri

(57) ABSTRACT

The present invention includes a system for removing drift from a head-worn gyro, which utilizes forward and rearward looking IR sensors, which are used to determine if gyro output signals, which indicate downward or upward rotation of the head, are correct.

20 Claims, 5 Drawing Sheets

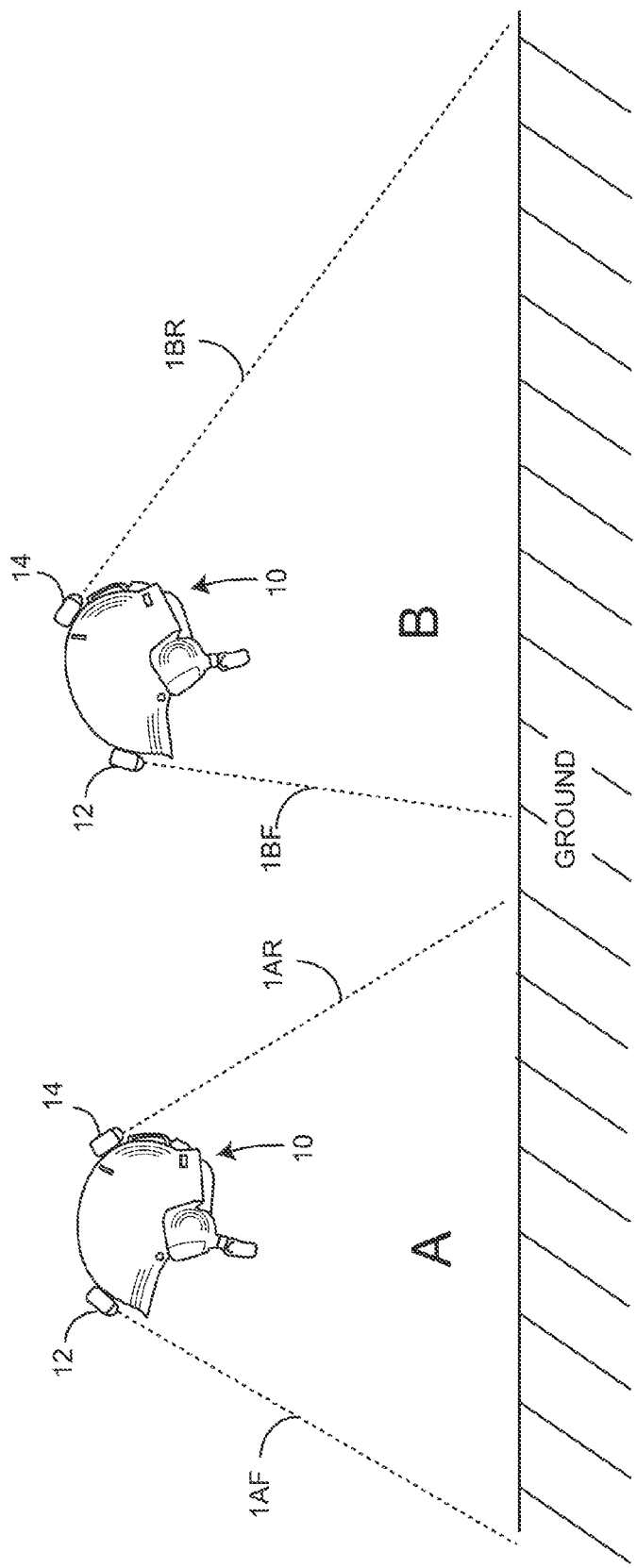

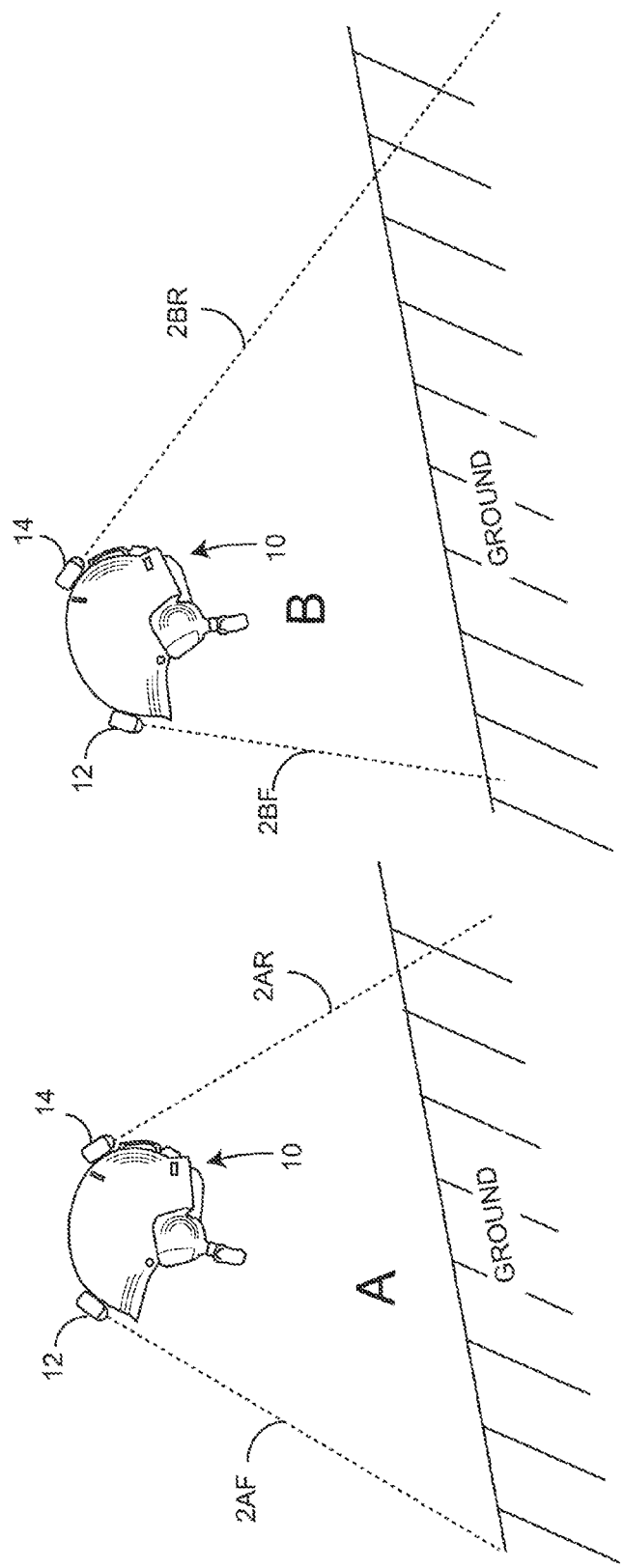

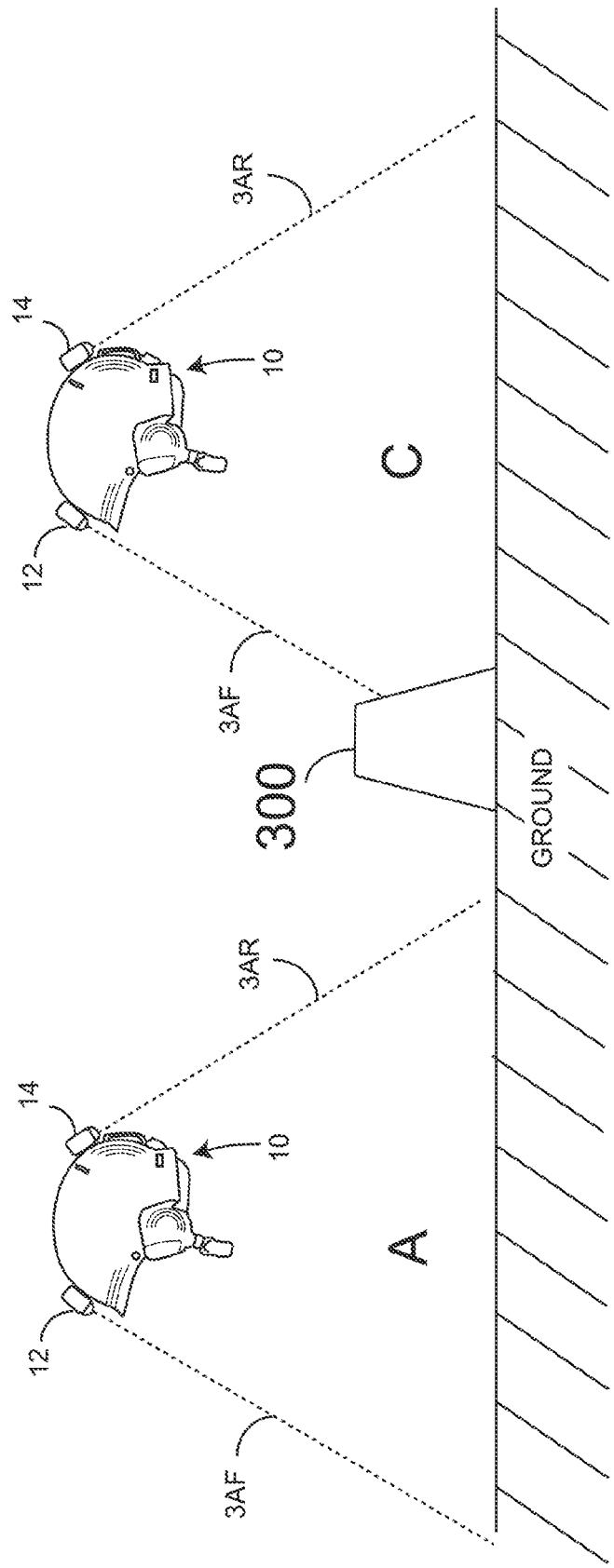

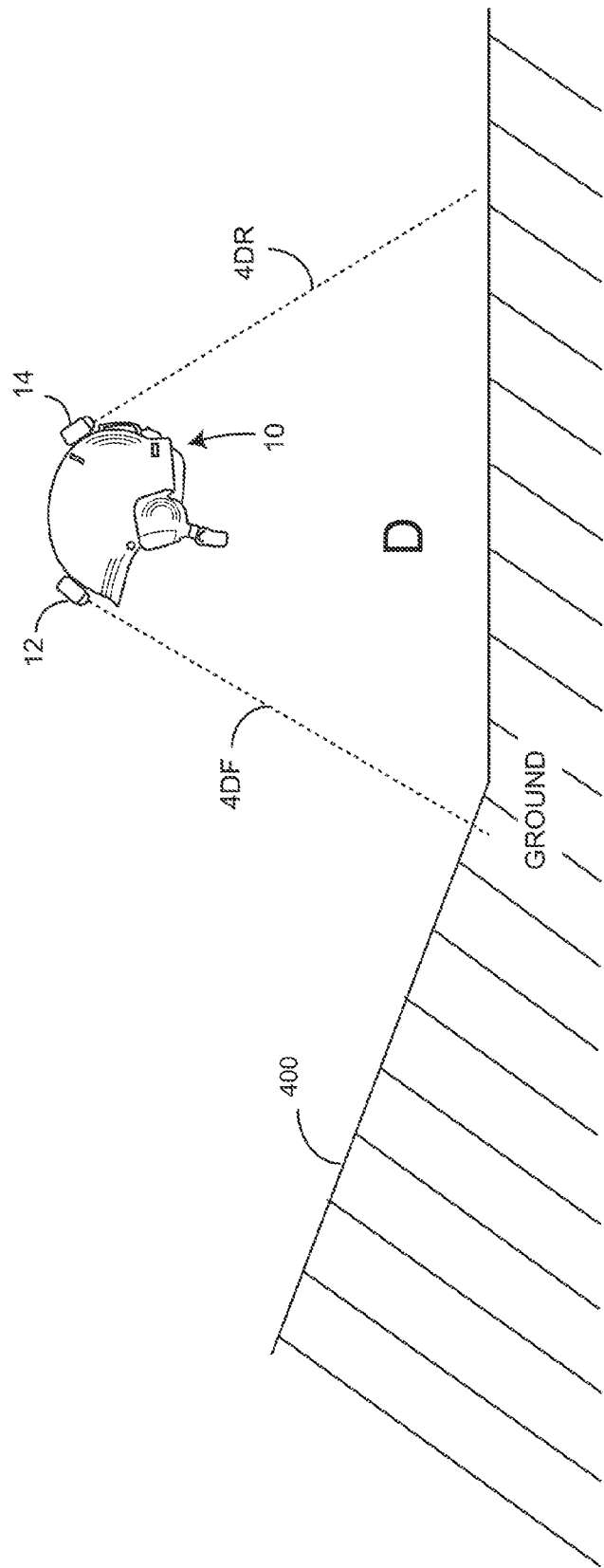

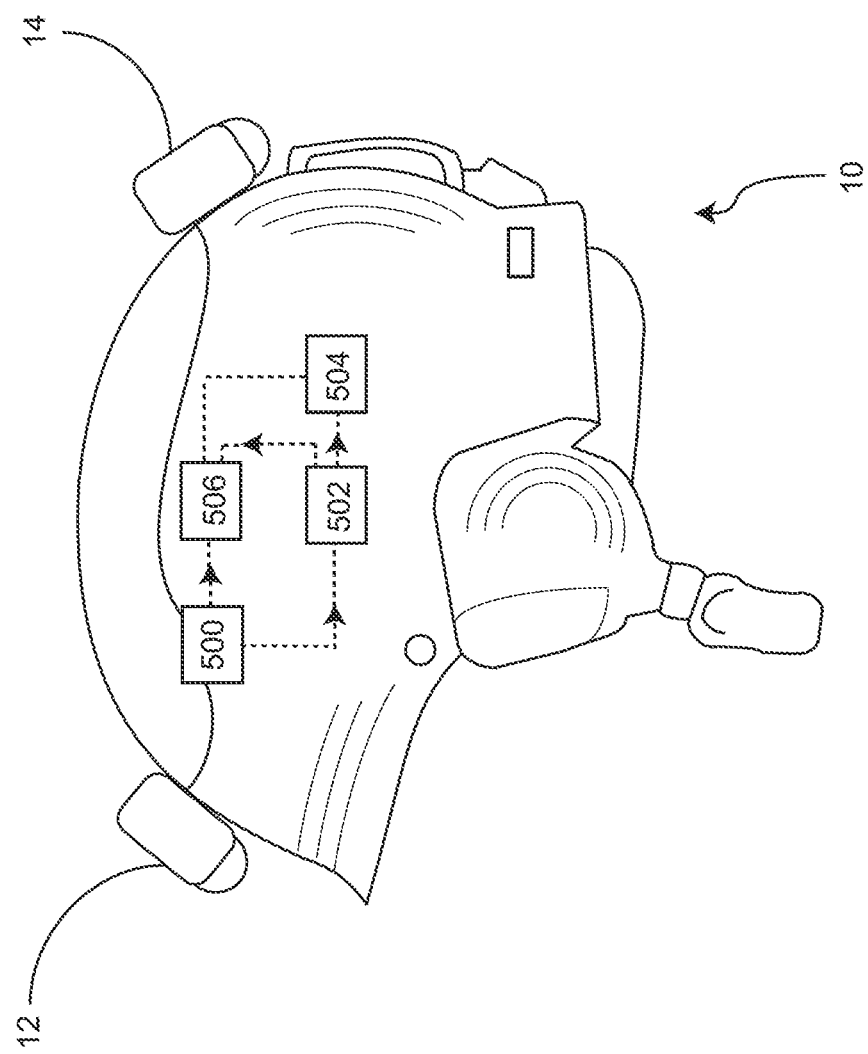

WEARABLE HEAD TRACKING SYSTEM

FIELD OF THE INVENTION

The present invention relates to head tracking systems, and more especially to improved systems and methods for wearable head tracking systems for use while walking, including walking on uneven terrain in an uncontrolled environment, such as outdoors.

BACKGROUND OF THE INVENTION

In the past, Micro-Electro-Mechanical System (MEMS) gyroscopes (gyro) have been widely available in the industry, but with their unavoidable drift, often provide insufficient performance for use for head tracking systems, unless some calibrating or corrective augmentation of the MEMS is employed.

Head tracking has been known to be used for gyroscopic or inertial measurement augmentation. Such augmentation has been done with optical, ultrasonic, and magnetic techniques, each with various deficiencies.

One common deficiency is that they often are limited to use in controlled environments, such as an aircraft cockpit. When an open and/or uncontrolled environment exists, such as with a person walking outdoors, the necessary hardware to perform precise head tracking is often expensive, heavy and power hungry. With these deficiencies, prior art head tracking systems may have been believed to be unsuitable for augmentation of inertial measurement units for many head tracking systems.

The present invention overcomes one or more of these problems.

SUMMARY OF THE INVENTION

It is an object of the present invention to provide a system and method for head tracking while walking.

It is a feature of the present invention to include a range finder augmentation of a MEMS gyro output.

It is an advantage of the present invention to provide for a low cost system for correcting gyro drift.

Accordingly, the present invention is a method of removing drift from a body-worn gyro comprising the steps of:

Providing a body-worn gyro which outputs gyro rotation rate signals;

Monitoring a forward looking distance to the ground in front of a person wearing said body-worn gyro;

Monitoring a rearward looking distance to the ground behind a person wearing said body-worn gyro;

Augmenting said gyro rotation rate signals when:
said gyro rotation rate signals indicate that a head of a person has rotated to a more downward looking orientation;
said forward looking distance has not decreased; and
said rearward looking distance has not increased.

BRIEF DESCRIPTION OF THE DRAWINGS

FIG. 1 shows a typical flat terrain environment for a head tracking system.

FIG. 2 shows a typical continuously sloped terrain environment for a head tracking system.

FIG. 3 shows a typical flat terrain environment with an obstacle for a head tracking system.

FIG. 4 shows a typical non-continuously sloped terrain environment for a head tracking system.

FIG. 5 is a block diagram of a representative electronic system utilizing the head tracking system of the present invention.

DETAILED DESCRIPTION

Now referring to the Figures, wherein like numerals refer to like matter throughout, and more particularly referring to FIG. 1, there is shown a helmet 10, which is shown in two configurations, as if it were worn by a single person walking (not shown). In configuration A, head worn structure 10 is shown at angle, which herein shall be described as forward looking. In configuration B, the angle of head worn structure 10 is described here as downward looking. In configuration A, the distance from head worn structure forward illuminating infra-red distance measuring apparatus 12 to the ground along line 1AF is roughly the same as the distance from head worn structure rearward illuminating infra-red distance measuring apparatus 14 to the ground along line 1AR. It should be noted that, throughout this description, infra-measuring sensors are described because they are believed to provide practical cost effective performance. However, it should be understood that other systems for measuring distance could be used and, in some cases, such as laser range finders, may provide superior accuracy, albeit at a higher cost. Ultrasonic and other range finders could be used as well in some applications. In configuration B, the head worn structure is downward looking and the head worn structure forward illuminating infra-red distance measuring apparatus 12 points along a line 1 BF, which is shorter than 1AF, and the line 1 BR from head worn structure rearward illuminating infra-red distance measuring apparatus 14 in configuration B is longer than the corresponding line 1AR in configuration A. From this information, the system of the present invention infers that a downward looking rotation of the head worn structure 10 has occurred from configuration A to configuration B. A corollary of this is that, if the distance measuring apparatuses do report any change from configuration A to configuration B, it can be inferred that the head worn structure 10 is angularly stationary about the axis perpendicular to the head worn structure forward illuminating infra-red distance measuring apparatus 12 and head worn structure rearward illuminating infra-red distance measuring apparatus 14. This is helpful in calibrating out drift from a gyroscope, i.e., if a gyro is reporting out a rotation and the head worn structure forward illuminating infra-red distance measuring apparatus 12 and head worn structure rearward illuminating infra-red distance measuring apparatus 14 do not report any change, then the rotation from the gyro is presumed to be drift (false report of rotation) and such output from the gyro will be ignored, or commensurately tagged for adjustment.

Now referring to FIG. 2, there is shown an example of the present invention in operation on an inclined plane. In configuration A, the length of the line 2AF and 2AR are not the same length with respect to each other, as was the case in configuration A of FIG. 1. In configuration B of FIG. 2, the line 2BF and the line 2BR are about the same in length. This demonstrates that it is not the absolute length of the line which is determinative of rotation but the rate of change of the value. In FIG. 2 going from configuration A to configuration B, a downward looking rotation is detected just as in FIG. 1, irrespective of the fact that FIG. 2 depicts an inclined plane, i.e., the system and method of the present invention have been shown to work on both a flat surface and an inclined plane.

Now referring to FIG. 3, there is shown a configuration A with a line 3AF from head worn structure forward illuminating infra-red distance measuring apparatus 12 and a line 3AR from head worn structure rearward illuminating infra-red distance measuring apparatus 14, which are approximately the same length. In configuration C, an obstacle 300 is shown and the distance 3CF from head worn structure forward illuminating infra-red distance measuring apparatus 12 to the obstacle 300 is now shorter than 3AF. However, line 3CR from head worn structure rearward illuminating infra-red distance measuring apparatus 14 to the ground remains the same length as 3AR in configuration A. Under this situation, the present invention will react to the obstacle with a conclusion that there has not been rotation. Since 3CR is unchanged from 3AR, any change in 3CF compared to 3AF will be ignored as not arising out of a rotation. This is because, as shown in FIG. 1, when there is rotation and there is change in a forward looking distance, there will also be a change in the rearward looking distance.

Now referring to FIG. 4, there is shown a configuration D where the ground is not continuously sloped. Indeed, there is a point of inclination 400 where the ground begins to go uphill. Configuration D is treated the same as configuration C of FIG. 3. As the head worn structure 10 moves closer to the point of inclination 400, the line 4DF gets progressively shorter while the line 4DR remains the same. The system of the present invention does not report rotation unless both the head worn structure forward illuminating infra-red distance measuring apparatus 12 and the head worn structure rearward illuminating infra-red distance measuring apparatus 14 report distance change, which are used to calculate head worn structure rotation, and those calculated head worn structure rotation changes are equal and opposite for the forward sensor rotation and the rear sensor rotation.

Now referring to FIG. 5, there is shown a detailed view of an exemplary head worn structure 10, which includes a head worn structure forward illuminating infra-red distance measuring apparatus 12 and a head worn structure rearward illuminating infra-red distance measuring apparatus 14, which both output a signal which is representative of a distance measurement to an IR comparator 500 or any hardware, software or combination which performs the function of monitoring changes in the measured distances, a MEMS gyro 502, which could be substituted with other inertial measurement units with known trade-offs and a controller 504. Also shown is a MEMS/IR interface 506, which could be independent as shown, or included within either 502 or 504. This location (502, 504, or 506) of the place of final utilization of the data from head worn structure forward illuminating infra-red distance measuring apparatus 12 and head worn structure rearward illuminating infra-red distance measuring apparatus 14 is a matter of designers choice and is expected to vary, depending on design details for differing applications. In FIG. 5, the combined dashed and dotted line shows an embodiment where no independent MEMS/IR interface 506 is present. When there is a MEMS/IR interface 506, the data may follow along the dotted lines.

In one embodiment, controller 504 is a microprocessor or controller for a head tracking system, which may be coupled to a display, radio or other useful device. In another embodiment of the present invention, controller 504 could be coupled to a heads-up display disposed on the head worn structure 10 and displaying information, such as location of items of interest which cannot be readily seen due to darkness, obstructions, smoke etc.

The above description has been focused on 2D head worn structure forward illuminating infra-red distance measuring apparatus 12 and head worn structure rearward illuminating infra-red distance measuring apparatus 14 rotating around the same axis of rotation to detect forward and rearward head tilting. The present invention can be a 3D system where additional sensors could be deployed for measuring side to side head movements with similar logic and structure.

The invention has been described herein as a head tracking system because it is believed that such an application is well suited for the present invention. It should, however, be understood that other applications which are not for head tracking are contemplated, such as turn by turn navigation and compass display and others.

The above description is intended to describe preferred or exemplary embodiments of the present invention. It should be understood that the present invention is not intended to be limited by the inclusion of details in this description. Instead, the Applicant intends that the present invention will include variations of the claimed invention without departing from the spirit and scope of the invention.

What is claimed is:

1. A lightweight, wearable head tracking system comprising:
   a head worn structure;
   a head worn structure forward illuminating infra-red (IR) distance measuring apparatus, coupled to said head worn structure and configured to measure a forward distance to the ground in front of a person walking wearing said head worn structure;
   a head worn structure rearward illuminating infra-red distance measuring apparatus, coupled to said head worn structure; and configured to measure a rear distance to the ground behind a person walking wearing said head worn structure;
   an infra-red distance comparator configured to monitor changes of said forward distance and said rear distance and to generate a calibration signal representative of rotation of said head worn structure around a predetermined axis if, and only if, said changes of said forward distance and said rear distance are used to calculate corresponding forward head worn structure sensor rotation and rear head worn structure sensor rotation which are opposing each other;
   a gyro mounted to said head worn structure and generating a gyro output signal, which indicates a rotation rate of said head worn structure around said predetermined axis of rotation;
   a drift controller for selectively augmenting said gyro output signal when indicating gyro rotation rate about said predetermined axis of rotation when said calibration signal is representative of rotation, which is inconsistent with said gyro rotation rate; and
   a head tracking controller configured to utilize said gyro out signal after being augmented by said drift controller.

2. The system of claim 1 wherein said head worn structure forward illuminating infra-red distance measuring apparatus outputs a signal containing differential distance data.

3. The system of claim 2 wherein said infra-red distance comparator is performed in a module housing said gyro.

4. The system of claim 3 wherein said drift controller is performed by said gyro.

5. The system of claim 1 wherein said infra-red distance comparator generates a calibration signal if, and only if, said changes of said forward distance and said rear distance are used to calculate corresponding forward head worn structure sensor rotation and rear head worn structure sensor rotation, which are equal and opposite with respect to each other.

6. A method of removing drift from a body-worn gyro comprising the steps of:
   providing a head worn structure with a gyro thereon, which outputs gyro rotation rate signals;

monitoring a forward looking distance from a point on the head worn structure to the ground in front of a person wearing said head worn structure;

monitoring a rearward looking distance from a point on the head worn structure to the ground behind a person wearing said head worn structure; and augmenting said gyro rotation rate signals when:

said gyro rotation rate signals indicate that said head worn structure has rotated to a different orientation;

said forward looking distance has not changed; and said rearward looking distance has not changed.

7. The method of claim 6 wherein said step of monitoring a forward looking distance involves emitting laser light from the head worn structure.

8. The method of claim 7 wherein said gyro is a micro electromechanical system (MEMS) gyro.

9. The method of claim 8 wherein said step of monitoring a forward looking distance comprises outputting a signal which is representative of a rate of change of said forward looking distance.

10. The method of claim 6 wherein said step of augmenting said gyro signals occurs when:

said gyro rotation rate signals indicate that said head worn structure has rotated to a more downward looking orientation;

a determination has been made that said forward looking distance has not decreased; and a determination has been made that said rearward looking distance has not increased.

11. The method of claim 6 wherein said step of augmenting said gyro signals occurs when:

said gyro rotation rate signals indicate that said head worn structure has rotated to a different orientation;

a forward sensor rotation rate has been calculated using the forward looking distance, and a rear sensor rotation rate has been calculated using the rearward looking distance; and said forward sensor rotation rate and said rear sensor rotation rate are not in opposing directions.

12. The method of claim 6 wherein said step of augmenting said gyro signals occurs when:

said gyro rotation rate signals indicate that said head worn structure has rotated to a different orientation;

a forward sensor rotation rate has been calculated using the forward looking distance, and a rear sensor rotation rate has been calculated using the rearward looking distance; and said forward sensor rotation rate and said rear sensor rotation rate are not equal in magnitude.

13. The method of claim 6 wherein said step of augmenting said gyro signals occurs when:

said gyro rotation rate signals indicate that said head worn structure has rotated to a different orientation;

a forward sensor rotation rate has been calculated using the forward looking distance, and a rear sensor rotation rate has been calculated using the rearward looking distance; and said forward sensor rotation rate and said rear sensor rotation rate are not substantially equal in magnitude and opposite in direction.

14. A system for generating a reduced drift gyro output comprising:

a head-worn structure configured to be worn by a person while walking;

an inertial measurement unit coupled to said head-worn structure and configured to generate IMU signals representative of forward and rearward rotation rate of said head-worn structure;

a forward looking sensor secured to said head-worn structure, said forward looking sensor being configured to measure a forward distance to objects located along a predetermined forward looking line with respect to said head-worn structure;

a rearward looking sensor secured to said head-worn structure, said rearward looking sensor being configured to measure a rearward distance to objects located along a predetermined rearward looking line with respect to said head-worn structure; and means for augmenting forward rotation indicating and rearward rotation indication signals if, and only if:

said IMU signals indicate that said head-worn structure has experienced one of forward rotation and rearward rotation; and changes in said forward distance and changes in said rearward distance are used to calculate corresponding forward head worn structure sensor rotation and rear head worn structure sensor rotation which are not both equal and opposite with respect to each other.

15. The system of claim 14 wherein said head-worn structure is a head worn structure.

16. The system of claim 14 wherein said forward looking sensor is an infra-red distance measuring sensor.

17. The system of claim 14 wherein said inertial measurement unit comprises a MEMS gyro.

18. The system of claim 14 wherein said means for augmenting is integrated with said inertial measurement unit.

19. The system of claim 14 wherein said means for augmenting is located outside of said inertial measurement unit.

20. The system of claim 16 wherein:

said inertial measurement unit comprises a MEMS gyro;

said forward looking sensor comprises an IR sensor; and said means for augmenting comprises an independent MEMS/IR interface.

\* \* \* \* \*